United States Patent [19]
Wu et al.

[11] Patent Number: 5,711,570
[45] Date of Patent: Jan. 27, 1998

[54] TELESCOPIC GLARESHADE FOR AUTOMOBILES

[76] Inventors: Sheng-Fen Wu, No.224, Wu-Fong N. Rd.; Yu-Chuan Lin, no.37, Fu-Sn St.3,, both of Chia-Yi City, Taiwan

[21] Appl. No.: 822,456

[22] Filed: Mar. 21, 1997

[51] Int. Cl.⁶ .................................................. B60J 3/02
[52] U.S. Cl. ............................................... 296/97.8
[58] Field of Search .......................... 296/97.8, 97.1, 296/97.6, 97.9

[56] References Cited

U.S. PATENT DOCUMENTS

| | | |
|---|---|---|
| 4,264,100 | 4/1981 | Keller, II ........................... 296/97.8 |
| 4,736,979 | 4/1988 | Harvey ........................... 296/97.8 X |
| 4,952,008 | 8/1990 | Lobanoff et al. ................... 296/97.8 |
| 5,042,867 | 8/1991 | Crotty, III et al. ................. 296/97.8 |
| 5,156,434 | 10/1992 | Vandagriff ........................ 296/97.8 |

Primary Examiner—Joseph D. Pape
Attorney, Agent, or Firm—Browdy and Neimark

[57] ABSTRACT

A telescopic glareshade is provided with an outer shelter and an inner shade board which is adjustably engaged with the outer shelter. The inner shade board has a bulged top end having a mushroom shaped cross section which can be in frictional contact with the inner faces of the outer shelter so as to constantly retain the shade board in place. The outer shelter has a longitudinal extended opening for the passage of the inner shade board and a pair of parallel stop flanges are defined on the edges of opening so as to prevent the inner shade board from disengagement from the outer shelter when pulled down to the bottommost end.

2 Claims, 3 Drawing Sheets

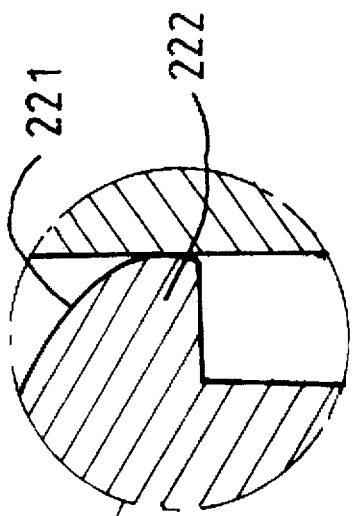
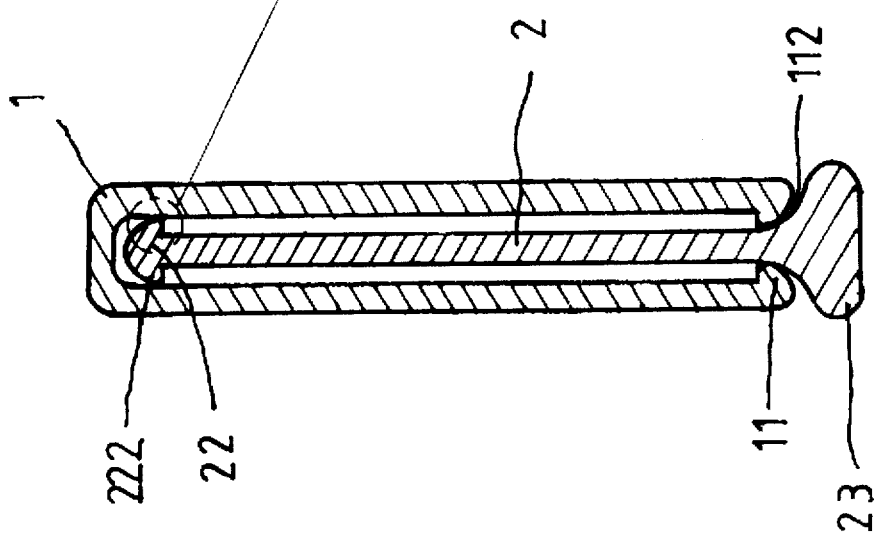

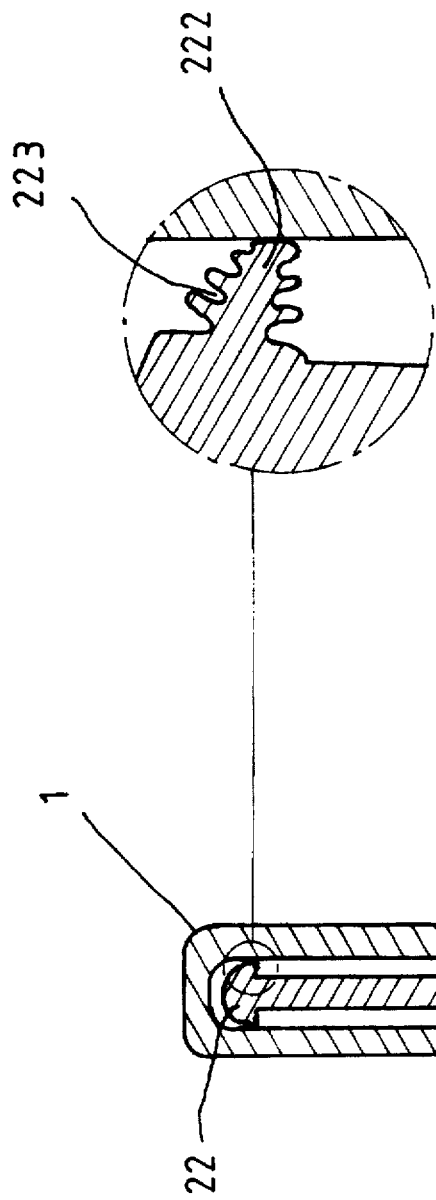
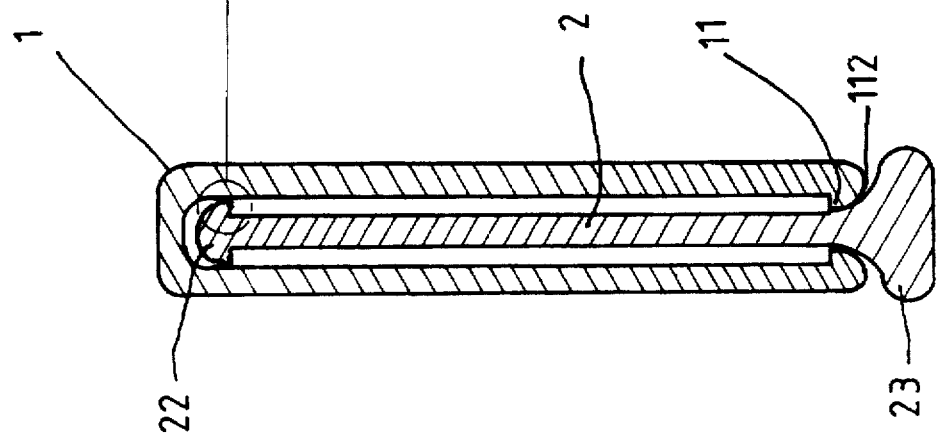
FIG. 3A
FIG. 3

TELESCOPIC GLARESHADE FOR AUTOMOBILES

BACKGROUND OF THE INVENTION

The present invention relates to a telescopic glareshade for use in automobiles to stop or prevent intensive glaring sun beams or head-to-head light beams from directly annoying the eyes of a vehicle's driver.

It is commnnly experienced by drivers of automobiles when driving at sunset in which the sun sets in the west or at sunrise in which the sun rises in the east, the intensive glaring sunbeams, directly shedding into the eyes of drivers of automobiles horizontally, get the eyes annoyed to such an extent that they are often not able to open their eyes or can not see clearly for a long period of time. That is rather dangerous when vehicles are moving at high speed under such circumstances. There have been many traffic accidents related to such annoyances in driving.

Although vehicles are commonly equipped with glareshades, but they are usually too small to effectively stop most of the sunbeams in practical use.

SUMMARY OF THE INVENTION

Therefore, the primary object of the present invention is to provide a telescopic glareshade which is adjustably extended or retracted in use so as to make the same to be suitable to different operational situations.

BRIEF DESCRIPTION OF THE DRAWINGS

FIG. 2 is a sectional view of the first embodiment of the present invention;

FIG. 2A is an enlarged diagram showing the retaining head of the first embodiment of the present invention;

FIG. 3 is a sectional view of the second embodiment of the present invention;

FIG. 3A is an enlarged diagram showing the retaining head of the second embodiment of the present invention.

DETAILED DESCRIPTION OF THE PREFERRED EMBODIMENT

Figure 1:
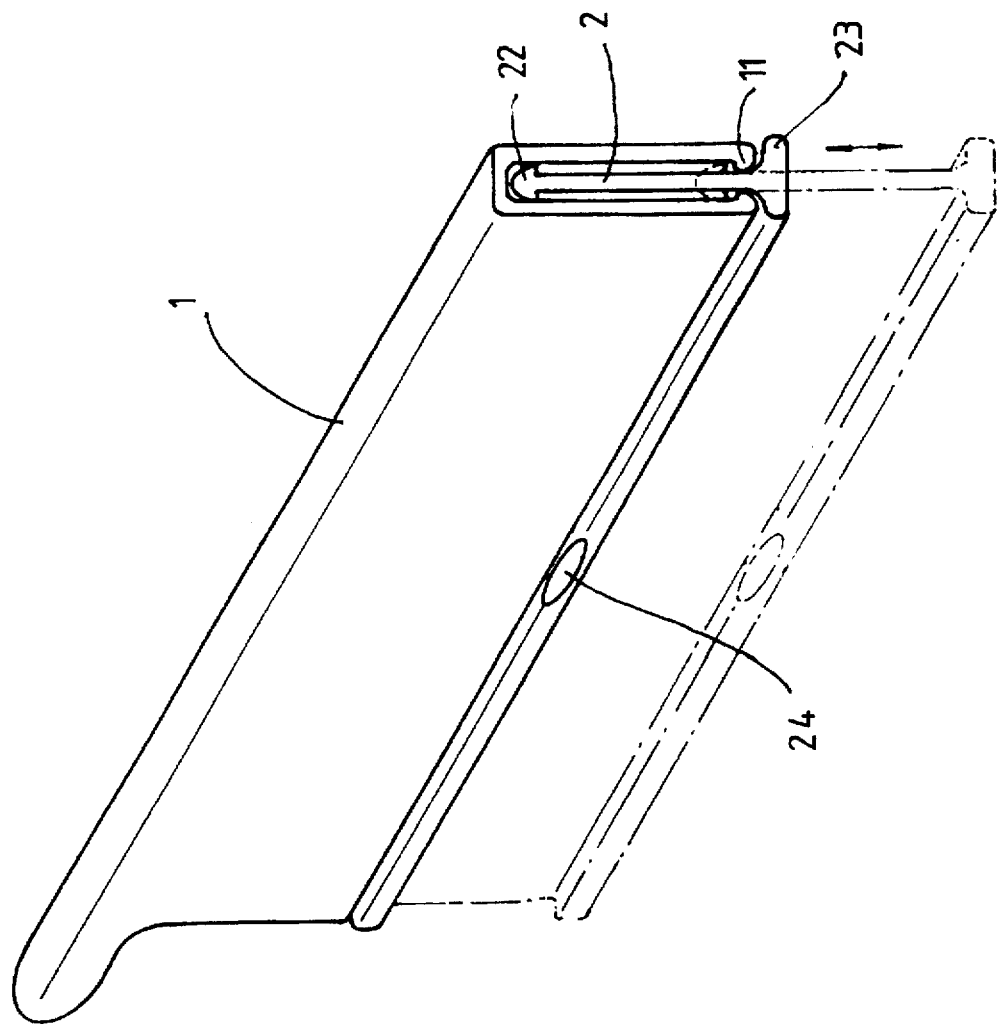
FIG. 1 is a perspective diagram showing the structure and operation mode of the present invention.

Referring to FIGS. 1, 2, 3, the telescopic glareshade of the present invention is made up of a hollow outer shelter 1, a telescopic inner shade board 2.

The outer shelter 1 is a hollow rectangular shade structure having a stop protrusion 11 defined at each of two parallel edges of a longitudinal opening 10 disposed at the bottom thereof.

The telescopic inner shade board 2 has a bulged top end 22 having a mushroom-shaped cross section in the first embodiment, as shown in FIGS. 2, 2A; and has a horizontally extended stop flange 23 defined at the bottom thereof. An oval shaped through hole 24 is located at the center of the stop flange 23 for easy holding of the inner shade board 2 in operation.

To assemble the outer shelter 1 and the inner shade board 2 together, the inner shade board 2 is guided into the bottom opening 10 with the bulged top end 22 of the inner shade board 2 moving against the stop protrusions 11 of the bottom opening 10 of the outer shelter 1.

Referring to FIGS. 2, 2A, the stop protrusions 11 having a mushroom-shaped cross section are provided with rounded head portion 221 and a pair of hooked portions 222. As further shown in FIG. 2, the stop protrusions 11 are also provided with smoothly rounded surfaces 112 so that the rounded head portion 221 can move smoothly against the rounded surfaces 112 of the stop protrusions 11, resulting in the final telescopic engagement of the shade board 2 with the outer shelter 1. As the inner shade board 2 is pulled down to the bottom end of the outer shelter 1, the hooked portions 222 of the bulged top end 22 come into limiting engagement with the stop protrusions 11 so as to prevent the inner shade board 2 from disengagement from the outer shelter 1.

The bulged top end 22 of the inner shade board 2 is in frictional engagement with the inner surfaces of the outer shelter 1 and the stop protrusions 11 of the outer shelter 1 are in frictional contact with the surfaces of the shade board 2 so that the inner shade board 2 can be retained constantly in position when the shade board 2 is telescopically moved for adjustment of the length of the shade in use.

Referring to FIGS. 3, 3A, in the second embodiment of the present invention, the hook portions 222 of the bulged top end 22 of the inner shade board 2 is provided with a plurality of teeth 223 so that the bulged top end 22 is flexibly operated during slide contact with the inner faces of the outer shelter 1, avoiding fast abrasion of the bulged top end 22 as a result of frictional contact in use.

When a driver is annoyed by the sunbeams in driving, the telescopic inner shade board 2 can be pulled down by way of holding the oval through hole 24 of the shade board 2 and pulling the same downwardly to a proper position according to the physical size of a driver.

We claim:

1. A telescopic glareshade fixable in a vehicle for stopping glaring sunbeams from annoying a driver, comprising:

a rectangular hollow outer shelter;

an inner shade board telescopically housed in said outer shelter;

said outer shelter having a bottom opening extending the full length longitudinally for insertion of said inner shade board;

at said opening a pair of parallel hooked stop protrusions being disposed at each longitudinal rim of said opening;

said stop protrusions being provided with smoothly rounded surfaces;

said inner shade board having a longitudinal bulged top end having a mushroom shaped cross section at the top side and a longitudinal stop flange disposed at the bottom side thereof;

a through hole being disposed at the center of said stop flange for easy holding of said inner shade board;

said bulged top end having a rounded surface so as to be easily pushed into said bottom opening of said outer shelter against said smoothly rounded surfaces of said stop protrusions in assembly;

said bulged top end having hooked portions which can be in limiting engagement with said stop protrusions so as to prevent said inner shade board from disengagement from said outer shelter when said telescopic inner shade board is being pulled to extend to its full length;

said bulged top end being in tight frictional contact with inner walls of said outer shelter and said hooked stop protrusions being clamped against said outer walls of said inner shade board so that said inner shade board is retainable in position when the inner shade board is telescopically adjusted.

2. A telescopic glareshade as claimed in claim 1 wherein said hooked portions of said bulged top end of said inner shade board are equipped with a a plurality of teeth so as to permit said hooked portions in frictional contact with the inner walls of said outer shelter to be flexibly operated when said inner shade board is pulled downwardly or pushed upwardly.

* * * * *